US012763858B2

(12) United States Patent
Wu et al.

(10) Patent No.: US 12,763,858 B2
(45) Date of Patent: Oct. 13, 2026

(54) COMMUNICATION SYSTEM AND MASTER COMMUNICATION DEVICE AND SLAVE COMMUNICATION DEVICE

(71) Applicant: HTC Corporation, Taoyuan City (TW)

(72) Inventors: Chun-Yih Wu, Taoyuan City (TW); Ta-Chun Pu, Taoyuan City (TW); Yen-Liang Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 57 days.

(21) Appl. No.: 18/963,122

(22) Filed: Nov. 27, 2024

(65) Prior Publication Data

US 2026/0095259 A1 Apr. 2, 2026

(30) Foreign Application Priority Data

Oct. 1, 2024 (TW) ................................ 113137513

(51) Int. Cl.
*H04B 13/00* (2006.01)
*H04L 7/06* (2006.01)

(52) U.S. Cl.
CPC ............ *H04B 13/005* (2013.01); *H04L 7/06* (2013.01)

(58) Field of Classification Search
CPC ................................. H04B 13/00; H04L 7/00
See application file for complete search history.

(56) References Cited

U.S. PATENT DOCUMENTS 8,253,693 B2 * 8/2012 Buil .................... H04B 13/005 345/169
8,254,340 B2 * 8/2012 Sarashina ............ H04J 14/005 370/335

(Continued)

FOREIGN PATENT DOCUMENTS

CN 1701544 A * 11/2005 ............ H04B 13/00
CN 101855848 A * 10/2010 ............ H04B 13/02

(Continued)

OTHER PUBLICATIONS

H. Cho, J. Bae and H.-J. Yoo, "A 37.5 /spl mu/W Body Channel Communication Wake-Up Receiver With Injection-Locking Ring Oscillator for Wireless Body Area Network," in IEEE Transactions on Circuits and Systems I: Regular Papers, vol. 60, No. 5, pp. 1200-1208, May 2013, (Year: 2013).*

(Continued)

*Primary Examiner* — Berhanu Tadese

(74) *Attorney, Agent, or Firm* — Birch, Stewart, Kolasch & Birch, LLP

(57) ABSTRACT

A communication system includes a master communication device and a slave communication device. The master communication device includes a first signal generator, a second signal generator, a signal combiner, and a transmitting HBC (Human Body Communication) electrode. The signal combiner combines a first signal with a second signal, so as to generate a third signal. The transmitting HBC electrode transmits the third signal through a human body. The slave communication device includes a receiving HBC electrode, a signal splitter, a processor, and an injection-locked DCO (Digital Control Oscillator). The receiving HBC electrode receives a mix signal from the human body. The signal splitter divides the mix signal into a data signal and a synchronization signal. The injection-locked DCO performs a time synchronization process according to the synchronization signal.

14 Claims, 6 Drawing Sheets

(56) References Cited

U.S. PATENT DOCUMENTS

| | | | | | |
|---|---|---|---|---|---|
| 8,633,809 | B2 * | 1/2014 | Schenk | A61B 5/0024 340/545.4 |
| 9,331,878 | B2 * | 5/2016 | Cheng | H04L 27/12 |
| 9,568,506 | B2 * | 2/2017 | Fujinoki | A61B 5/0059 |
| 9,967,039 | B2 * | 5/2018 | Kim | H04L 5/0048 |
| 10,187,164 | B2 * | 1/2019 | Kim | H04B 13/00 |
| 10,623,114 | B2 * | 4/2020 | Ouzounov | H04L 5/16 |
| 11,742,958 | B2 * | 8/2023 | Sen | H04B 13/005 455/41.1 |
| 12,316,388 | B2 * | 5/2025 | Yoo | H02M 3/1582 |
| 12,381,638 | B2 * | 8/2025 | Sen | H02J 50/12 |
| 2008/0259043 | A1 * | 10/2008 | Buil | H04B 13/005 345/173 |
| 2010/0315206 | A1 * | 12/2010 | Schenk | A61B 5/0024 340/286.01 |
| 2011/0093712 | A1 * | 4/2011 | Jin | H04W 12/50 713/171 |
| 2015/0185256 | A1 * | 7/2015 | Fujinoki | A61B 5/0059 324/96 |
| 2018/0316442 | A1 * | 11/2018 | Kim | H04B 13/00 |
| 2019/0158191 | A1 * | 5/2019 | Ouzounov | H04W 56/004 |
| 2021/0258080 | A1 * | 8/2021 | Sen | H04B 13/005 |
| 2022/0193427 | A1 * | 6/2022 | Sen | A61N 1/37223 |
| 2025/0176830 | A1 * | 6/2025 | Sen | A61B 5/0031 |
| 2025/0202599 | A1 * | 6/2025 | Moorefield, Jr. | H04B 13/005 |
| 2025/0343606 | A1 * | 11/2025 | Sen | H04B 13/005 |
| 2025/0379663 | A1 * | 12/2025 | Sen | H04B 13/005 |

FOREIGN PATENT DOCUMENTS

| | | | | | |
|---|---|---|---|---|---|
| CN | 1866772 | B | * | 12/2010 | H04B 13/005 |
| CN | 1905409 | B | * | 10/2011 | H04B 13/005 |
| CN | 105122692 | A | * | 12/2015 | H04W 12/64 |
| CN | 113134218 | A | | 7/2021 | |
| CN | 113134218 | B | * | 5/2022 | A63B 24/0062 |
| CN | 117978602 | A | * | 5/2024 | H04L 27/2334 |
| CN | 118786635 | A | * | 10/2024 | H04B 13/005 |
| CN | 119544092 | A | * | 2/2025 | H04B 13/005 |
| CN | 120856879 | A | * | 10/2025 | H04B 13/005 |
| EP | 1854231 | B1 | * | 4/2013 | H04B 13/005 |
| EP | 2241033 | B1 | * | 6/2017 | A61B 5/0024 |
| EP | 3544194 | A1 | * | 9/2019 | H04L 27/152 |
| EP | 3544194 | B1 | * | 11/2020 | H04L 27/16 |
| EP | 3780404 | A1 | * | 2/2021 | H04B 5/26 |
| EP | 3455962 | B1 | * | 3/2024 | H04B 13/005 |
| FR | 3016102 | A1 | * | 7/2015 | H03J 7/02 |
| JP | 2012023565 | A | * | 2/2012 | G06K 19/0672 |
| JP | 2019036823 | A | * | 3/2019 | H04B 13/00 |
| KR | 20200018352 | A | * | 2/2020 | G06K 19/0723 |
| SG | 2013067491 | A | * | 4/2014 | H04B 13/005 |
| WO | WO-2006087670 | A1 | * | 8/2006 | H04B 13/005 |
| WO | WO-2009081343 | A1 | * | 7/2009 | A61B 5/0028 |
| WO | WO-2014188685 | A1 | * | 11/2014 | A61B 5/0059 |
| WO | WO-2017061722 | A1 | * | 4/2017 | H04B 13/00 |
| WO | WO-2019035284 | A1 | * | 2/2019 | H04B 13/00 |
| WO | WO-2020032701 | A1 | * | 2/2020 | H04B 5/26 |
| WO | WO-2023163840 | A1 | * | 8/2023 | H04B 13/005 |
| WO | WO-2024129792 | A1 | * | 6/2024 | H10N 10/13 |

OTHER PUBLICATIONS

H. Cho, J. Bae and H.-J. Yoo, "A 39 µW body channel communication wake-up receiver with injection-locking ring-oscillator for wireless body area network," 2012 IEEE International Symposium on Circuits and Systems (ISCAS), Seoul, Korea (South), 2012, pp. 2641-2644, (Year: 2012).*

H. Cho, H. Kim, M. Kim, J. Jang, J. Bae and H.-J. Yoo, "21.1 A 79pJ/b 80Mb/s full-duplex transceiver and a 42.5µW 100kb/s super-regenerative transceiver for body channel communication," 2015 IEEE, pp. 1-3 (Year: 2015).*

Cho et al, 21.1_A_79pJ_b_80Mb_s_full-duplex_transceiver_and_a_42.5W_100kb_s_super-regenerative_transceiver_for_body_channel_communication, IEEE 2015 (Year: 2015).*

Cho et al., A_37.5__spl_mu_W_Body_Channel_Communication_Wake-Up_Receiver_With_Injection-Locking_Ring_Oscillator_for_Wireless_Body_Area_Network, IEEE 2013 (Year: 2013).*

Cho et al., A_39_W_body_channel_communication_wake-up_receiver_with_injection-locking_ring-oscillator_for_wireless_body_area_network, IEEE 2012 (Year: 2012).*

* cited by examiner

500

600

COMMUNICATION SYSTEM AND MASTER COMMUNICATION DEVICE AND SLAVE COMMUNICATION DEVICE

CROSS REFERENCE TO RELATED APPLICATIONS

This application claims priority of Taiwan Patent Application No. 113137513 filed on Oct. 1, 2024 the entirety of which is incorporated by reference herein.

BACKGROUND OF THE INVENTION

Field of the Invention

The invention relates to a communication system, and more particularly, it relates to a communication system and its master communication device and slave communication device.

Description of the Related Art

In the fields of VR (Virtual Reality) and AR (Augmented Reality), relative devices usually need to communicate wirelessly with other devices. However, in general, these wireless communications tend to have problems with not being synchronized between devices. Accordingly, there is a need to propose a novel solution for solving the problems of the prior art.

BRIEF SUMMARY OF THE INVENTION

In an exemplary embodiment, the invention is directed to a communication system for communication through a human body. The communication system includes a master communication device and a slave communication device. The master communication device includes a first signal generator, a second signal generator, a signal combiner, and a transmitting HBC (Human Body Communication) electrode. The first signal generator generates a first signal. The second signal generator generates a second signal. The signal combiner combines the first signal with the second signal, so as to generate a third signal. The transmitting HBC electrode transmits the third signal through the human body. The slave communication device includes a receiving HBC electrode, a signal splitter, a processor, and an injection-locked DCO (Digital Control Oscillator). The receiving HBC electrode receives a mix signal from the human body. The mix signal is related to the third signal. The signal splitter divides the mix signal into a data signal and a synchronization signal. The processor processes the data signal. The injection-locked DCO performs a time synchronization process according to the synchronization signal.

In some embodiments, the master communication device is implemented with an HMD (Head Mounted Display).

In some embodiments, the slave communication device is implemented with a tracker or a controller.

In some embodiments, the time synchronization process is used to synchronize the master communication device and the slave communication device.

In some embodiments, the first signal comprises data information.

In some embodiments, the second signal comprises synchronization information.

In some embodiments, both the first signal and the data signal fall within a first frequency band from 2 MHz to 80 MHz.

In some embodiments, both the second signal and the synchronization signal fall within a second frequency band from 80 MHz to 102 MHz.

In some embodiments, the synchronization signal is a pulse signal.

In some embodiments, the synchronization signal is a CW (Continuous Wave) signal.

In another exemplary embodiment, the invention is directed to a master communication device that includes a first signal generator, a second signal generator, a signal combiner, and a transmitting HBC electrode. The first signal generator generates a first signal. The second signal generator generates a second signal. The signal combiner combines the first signal with the second signal, so as to generate a third signal. The transmitting HBC electrode transmits the third signal.

In another exemplary embodiment, the invention is directed to a slave communication device that includes a receiving HBC electrode, a signal splitter, a processor, and an injection-locked DCO. The receiving HBC electrode receives a mix signal. The signal splitter divides the mix signal into a data signal and a synchronization signal. The processor processes the data signal. The injection-locked DCO performs a time synchronization process according to the synchronization signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
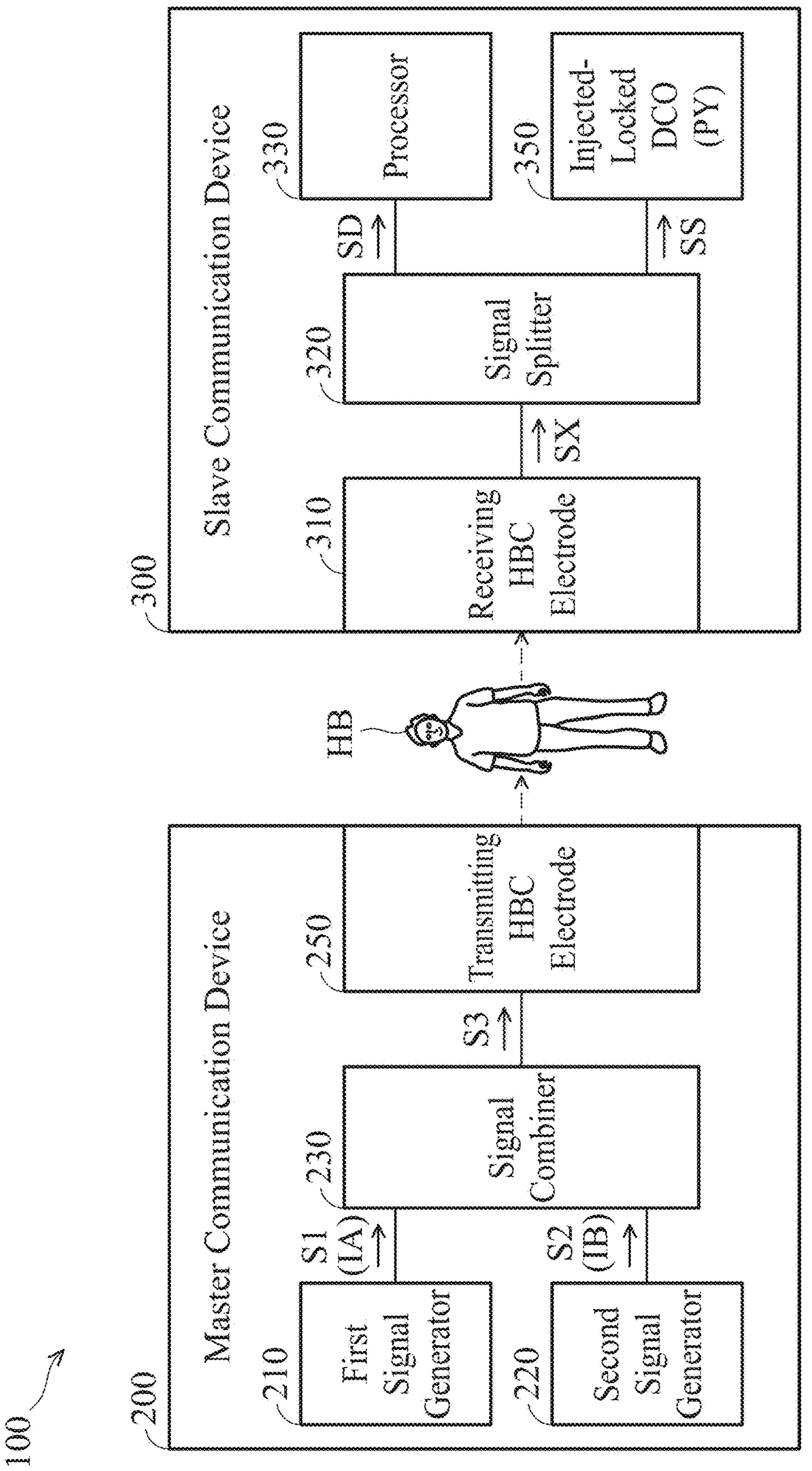
FIG. 1 is a diagram of a communication system according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication system 100 according to an embodiment of the invention. For example, the communication system 100 may be applied to the relative fields of VR (Virtual Reality) or AR (Augmented Reality), but it is not limited thereto. As shown in FIG. 1, the communication system 100 includes a master communication device 200 and a slave communication device 300. The master communication device 200 can communicate with the slave communication device 300 through a human body HB. The slave communication device 300 can be substantially controlled by the master communication device 200. It should be noted that the term "human body HB" refers to a portion of the body of the user, which does not belong to any element of the communication system 200.

The master communication device 200 includes a first signal generator 210, a second signal generator 220, a signal combiner 230, and a transmitting HBC (Human Body Communication) electrode 250. It should be understood that the master communication device 200 may further include other components, such as a display device and a power supply module, although they are not displayed in FIG. 1.

The first signal generator 210 can generate a first signal S1. For example, the first signal S1 may include data information IA, but it is not limited thereto. The second signal generator 220 can generate a second signal S2. For example, the second signal S2 may include synchronization information IB, but it is not limited thereto. In some embodiments, the first signal S1 and the second signal S2 have different frequencies. For example, the frequency of the second signal S2 may be higher than that of the first signal S1.

The signal combiner 230 has a first input terminal coupled to the first signal generator 210, a second input terminal coupled to the second signal generator 220, and an output terminal. The signal combiner 230 can combine the first signal S1 with the second signal S2, so as to generate a third signal S3. The transmitting HBC electrode 250 may be disposed on any position of the human body HB. The transmitting HBC electrode 250 is coupled to the output terminal of the signal combiner 230. In addition, the transmitting HBC electrode 250 can transmit the third signal S3 through the human body HB.

The slave communication device 300 includes a receiving HBC electrode 310, a signal splitter 320, a processor 330, and an injection-locked DCO (Digital Control Oscillator) 350. It should be understood that the slave communication device 300 may further include other components, such as an IMU (Inertial Measurement Unit) and a battery module, although they are not displayed in FIG. 1.

The receiving HBC electrode 310 is disposed on another position of the human body HB, and it may be different from the position where the transmitting HBC electrode 250 is located. The receiving HBC electrode 310 can receive a mix signal SX from the human body HB. The mix signal SX is related to the third signal S3 as mentioned above. For example, the mix signal SX is substantially equivalent to the third signal S3 minus the signal attenuation caused by an HBC mechanism, but it is not limited thereto.

The signal splitter 320 has an input terminal coupled to the receiving HBC electrode 310, a first output terminal, and a second output terminal. The signal splitter 320 can divide the mix signal SX into a data signal SD and a synchronization signal SS. In some embodiments, the data signal SD and the synchronization signal SS have different frequencies. For example, the frequency of the synchronization signal SS may be higher than that of the data signal SD. In some embodiments, the signal splitter 320 includes an LPF (Low-Pass Filter) and an HPF (High-Pass Filter) (not shown). The LPF can generate the data signal SD according to the mix signal SX. The HPF can generate the synchronization signal SS according to the mix signal SX.

The processor 330 is coupled to the first output terminal of the signal splitter 320. The processor 330 can process the data signal SD. The injection-locked DCO 350 is coupled to the second output terminal of the signal splitter 320. The injected-locked DCO 350 can perform a time synchronization process PY according to the synchronization signal SS. In some embodiments, the time synchronization process PY is used to synchronize the master communication device 200 and the slave communication device 300. For example, by using the time synchronization process PY, the time parameter setting of the slave communication device 300 may completely follow the time parameter setting of the master communication device 200, but they are not limited thereto.

With the design of the invention, the communication system 100 can process the data signal SD and the synchronization signal SS based on the HBC mechanism at the same time. According to practical measurements, the proposed communication system 100 can significantly suppress a variety of relative signal interferences, so as to effectively maximize the operational benefits of the time synchronization process PY of the communication system 100.

The following embodiments will introduce different configurations and detail structural features of the communication system 100. It should be understood that these figures and descriptions are merely exemplary, rather than limitations of the invention.

Figure 2:
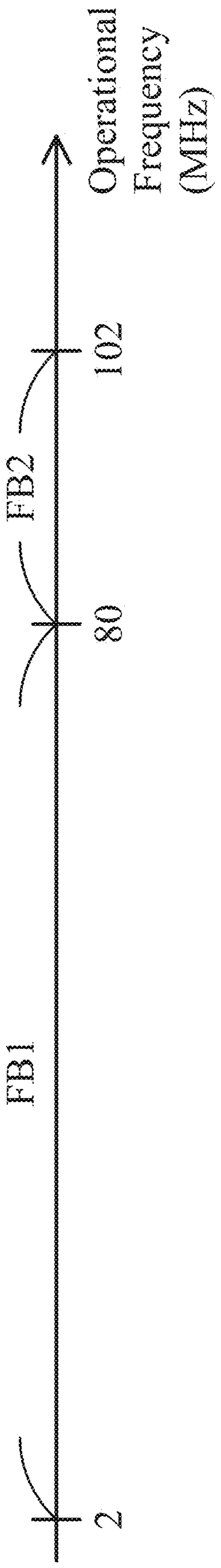
FIG. 2 is a diagram of the operational frequency of a communication system according to an embodiment of the invention.

FIG. 2 is a diagram of the operational frequency of the communication system 100 according to an embodiment of the invention. In the embodiment of FIG. 2, both the first signal S1 and the data signal SD fall within a first frequency band FB1, and both the second signal S2 and the synchronization signal SS fall within a second frequency band FB2. The second frequency band FB2 is higher than the first frequency band FB1. For example, the first frequency band FB1 may be from 2 MHz to 80 MHz, and the second frequency band FB2 may be from 80 MHz to 102 MHz, but they are not limited thereto. With such a design, the second signal S2 does not tend to interfere with the first signal S1, and the synchronization signal SS does not tend to interfere with the data signal SD, either.

Figure 3A:
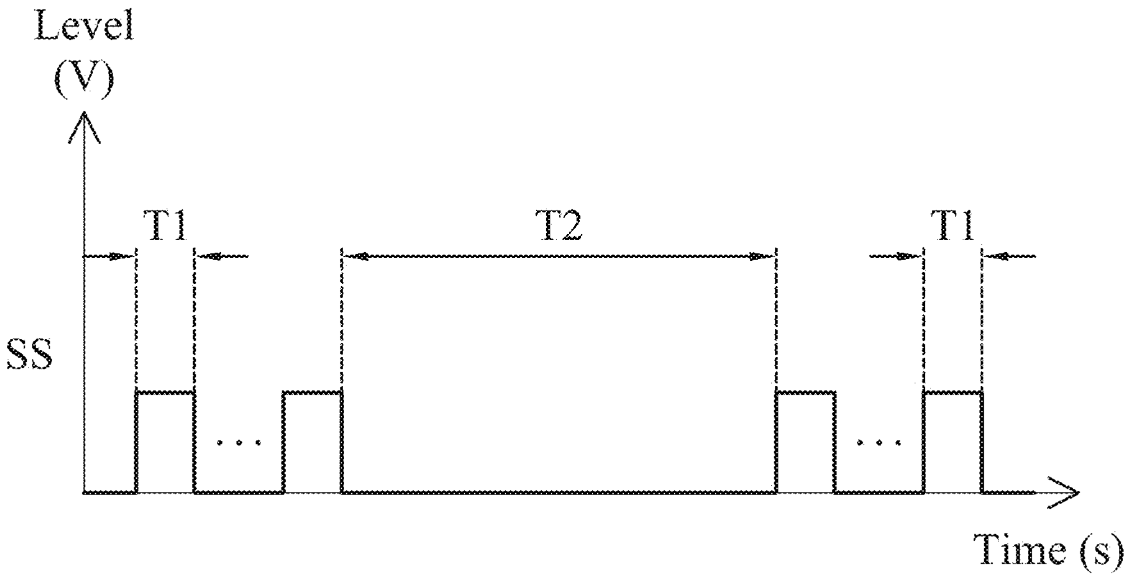
FIG. 3A is a diagram of the waveform of a synchronization signal according to an embodiment of the invention.

FIG. 3A is a diagram of the waveform of the synchronization signal SS according to an embodiment of the invention, where the horizontal axis represents the time(s), and the vertical axis represents the voltage level (V). In the embodiment of FIG. 3A, the synchronization signal SS is a pulse signal, and it includes a plurality of pulse groups which are periodically generated. For example, in the synchronization signal SS, the duration time T1 of each pulse may be from 4.9 ns to 12.5 ns (which correspond to 102 MHz and 80 MHz, respectively). In some embodiments, to ensure the synchronization effect, the total number of pulse groups is less than 10, and the time interval T2 between any two adjacent pulse groups is shorter than 10 seconds. According to practical measurements, such an application of the pulse signal can help to reduce the synchronization error of the communication system 100.

Figure 3B:
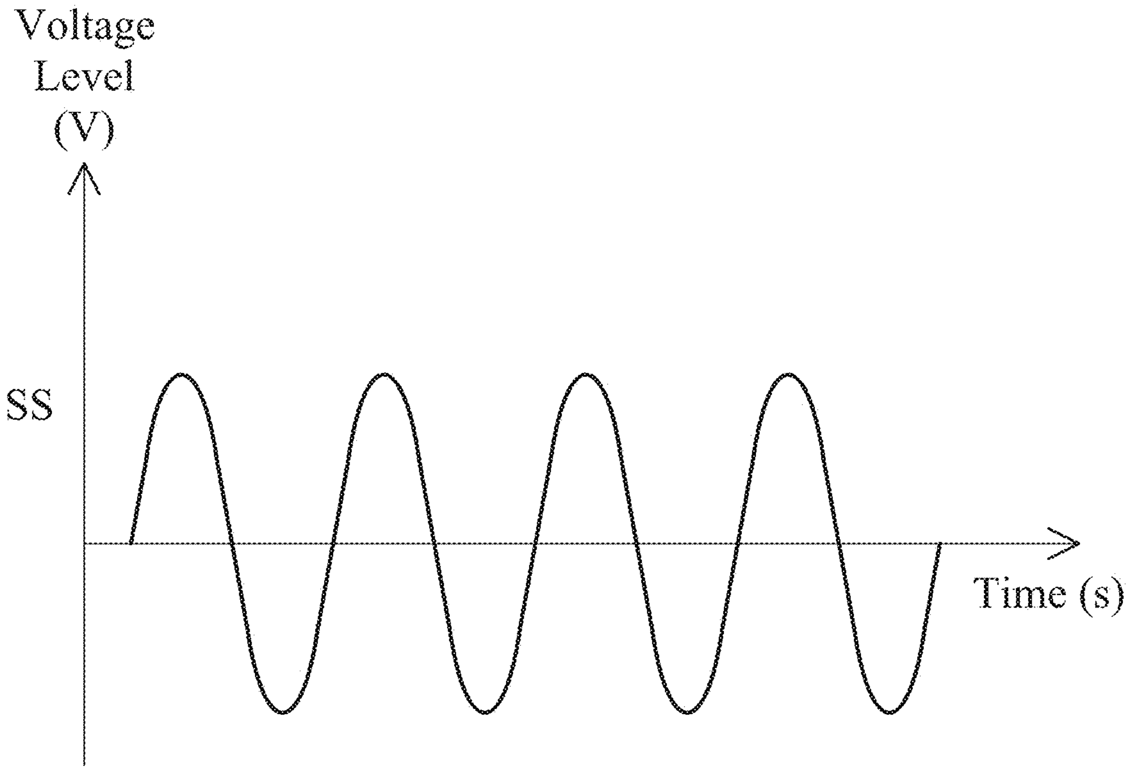
FIG. 3B is a diagram of the waveform of a synchronization signal according to another embodiment of the invention.

FIG. 3B is a diagram of the waveform of the synchronization signal SS according to another embodiment of the invention, where the horizontal axis represents the time(s), and the vertical axis represents the voltage level (V). In the embodiment of FIG. 3B, the synchronization signal SS is a CW (Continuous Wave) signal, which has a relatively narrow frequency range. According to practical measurements, such an application of the CW signal can help to reduce the circuit complexity of the communication system 100.

Figure 4:
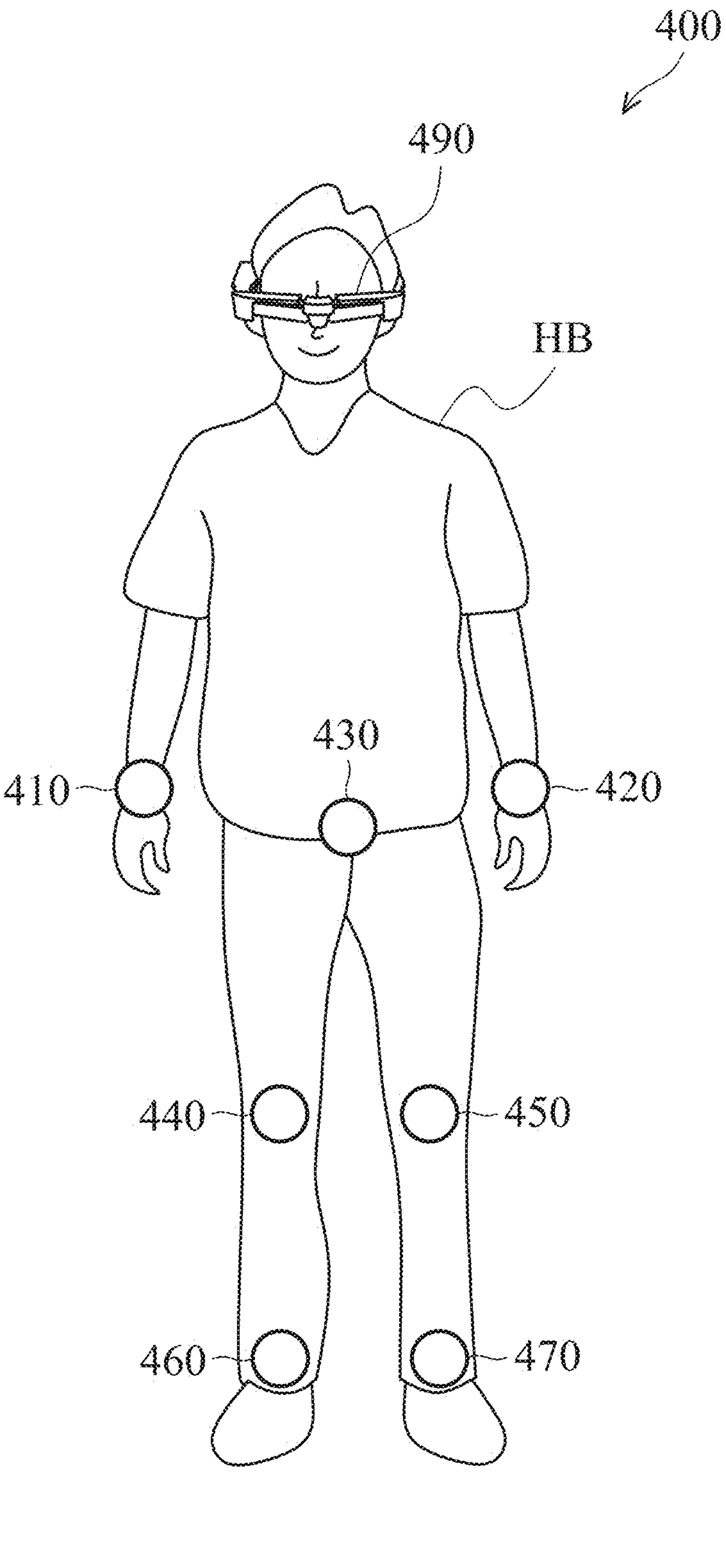
FIG. 4 is a diagram of a communication system according to an embodiment of the invention.

FIG. 4 is a diagram of a communication system 400 according to an embodiment of the invention. FIG. 4 is similar to FIG. 1. In the embodiment of FIG. 4, the communication system 400 includes a plurality of slave communication devices 410, 420, 430, 440, 450, 460 and 470, and a master communication device 490. For example, the master communication device 490 may be implemented with an HMD (Head Mounted Display). The slave communication devices 410, 420, 430, 440, 450, 460 and 470 may be disposed on different positions of the human body HB. For example, each of the slave communication devices 410 and 420 may be implemented with a controller, which may be disposed on a hand of the huma body HB. Furthermore, each of the slave communication devices 430, 440, 450, 460 and 470 may be implemented with a tracker, which may be disposed on a waist or a leg of the huma body HB. In some embodiments, the aforementioned controller and tracks are configured to detect the movement or the rotation of the human body HB, and they are all controlled by the HMD. In alternative embodiments, the total number of slave communication devices 410, 420, 430, 440, 450, 460 and 470 and their types are adjustable according to different requirements. Other features of the communication system 400 of FIG. 4 are similar to those of the communication system 100 of FIG. 1. Thus, the two embodiments can achieve similar levels of performance.

Figure 5:
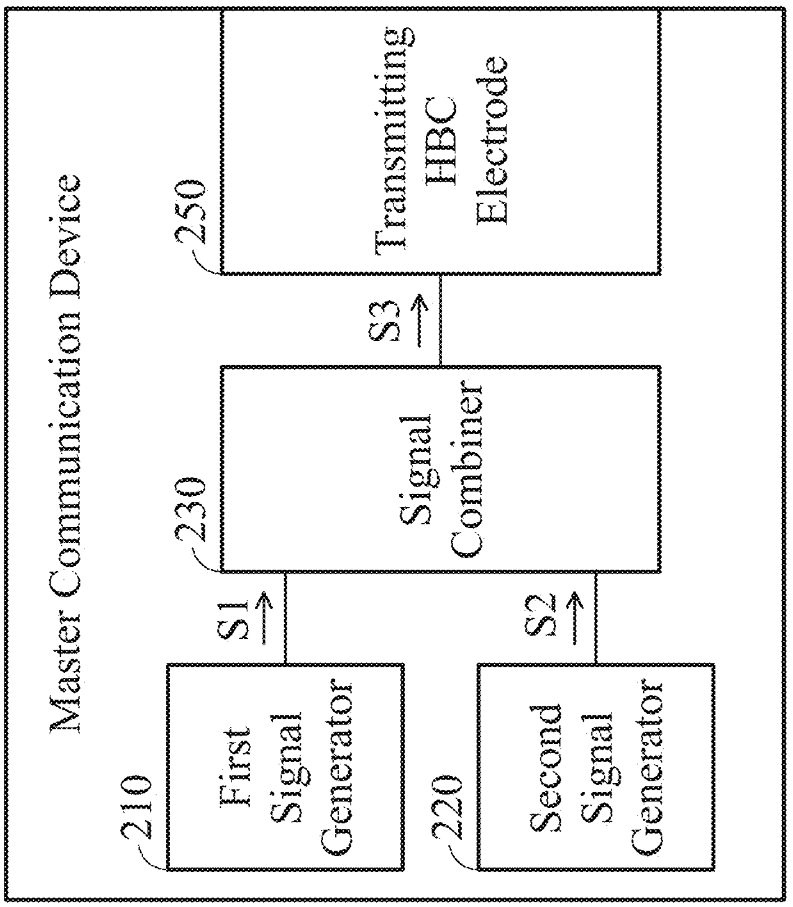
FIG. 5 is a diagram of a master communication device according to an embodiment of the invention.

FIG. 5 is a diagram of a master communication device 500 according to an embodiment of the invention. The master communication device 500 may have the same structure as that of the aforementioned master communication device 200. In the embodiment of FIG. 5, the master communication device 500 is used independently, and it does not involve any slave communication device.

Figure 6:
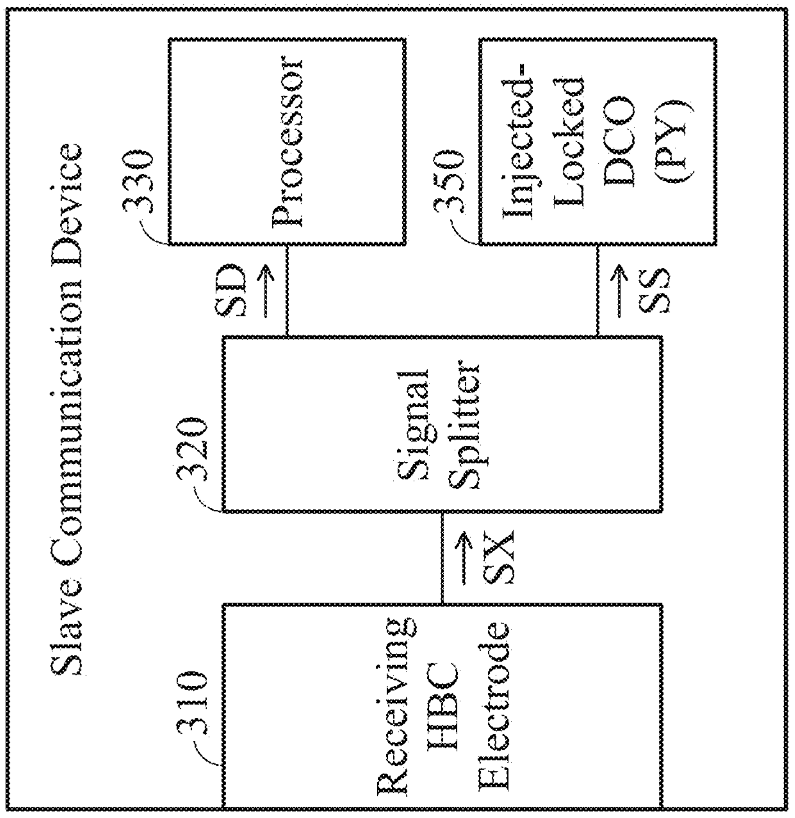
FIG. 6 is a diagram of a slave communication device according to an embodiment of the invention.

FIG. 6 is a diagram of a slave communication device 600 according to an embodiment of the invention. The slave communication device 600 may have the same structure as that of the aforementioned slave communication device 300. In the embodiment of FIG. 6, the slave communication device 600 is used independently, and it does not involve any master communication device.

The invention proposes a novel communication system, a novel master communication device, and a novel slave communication device. In comparison to the conventional design, the invention has at least the advantages of suppressing the signal interference and improving the time synchronization. Therefore, the invention is suitable for application in a variety of devices.

Note that the above element parameters are not limitations of the invention. A designer can fine-tune these setting values according to different requirements. It should be understood that the communication system, the master communication device, and the slave communication device of the invention are not limited to the configurations of FIGS. 1-6. The invention may include any one or more features of any one or more embodiments of FIGS. 1-6. In other words, not all of the features displayed in the figures should be implemented in the communication system, the master communication device, and the slave communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication system for communication through a human body, comprising:

a master communication device, comprising:
- a first signal generator, generating a first signal;
- a second signal generator, generating a second signal;
- a signal combiner, combining the first signal with the second signal, so as to generate a third signal; and
- a transmitting HBC (Human Body Communication) electrode, transmitting the third signal through the human body; and a slave communication device, comprising:
- a receiving HBC electrode, receiving a mix signal from the human body, wherein the mix signal is related to the third signal;
- a signal splitter, dividing the mix signal into a data signal and a synchronization signal;
- a processor, processing the data signal; and
- an injected-locked DCO (Digital Control Oscillator), performing a time synchronization process according to the synchronization signal;

wherein both the first signal and the data signal fall within a first frequency band from 2 MHz to 80 MHz;

wherein both the second signal and the synchronization signal fall within a second frequency band from 80 MHz to 102 MHz.

2. The communication system as claimed in claim 1, wherein the master communication device is implemented with an HMD (Head Mounted Display).

3. The communication system as claimed in claim 1, wherein the slave communication device is implemented with a tracker or a controller.

4. The communication system as claimed in claim 1, wherein the time synchronization process is used to synchronize the master communication device and the slave communication device.

5. The communication system as claimed in claim 1, wherein the first signal comprises data information.

6. The communication system as claimed in claim 1, wherein the second signal comprises synchronization information.

7. The communication system as claimed in claim 1, wherein the synchronization signal is a pulse signal.

8. The communication system as claimed in claim 1, wherein the synchronization signal is a CW (Continuous Wave) signal.

9. A master communication device, comprising:

a first signal generator, generating a first signal;

a second signal generator, generating a second signal;

a signal combiner, combining the first signal with the second signal, so as to generate a third signal; and a transmitting HBC (Human Body Communication) electrode, transmitting the third signal;

wherein the first signal falls within a first frequency band from 2 MHz to 80 MHz;

wherein the second signal falls within a second frequency band from 80 MHz to 102 MHz.

10. The master communication device as claimed in claim 9, wherein the master communication device is implemented with an HMD (Head Mounted Display).

11. A slave communication device, comprising:

a receiving HBC (Human Body Communication) electrode, receiving a mix signal;

a signal splitter, dividing the mix signal into a data signal and a synchronization signal;

a processor, processing the data signal; and an injected-locked DCO (Digital Control Oscillator), performing a time synchronization process according to the synchronization signal;

wherein the data signal falls within a first frequency band from 2 MHz to 80 MHz;

wherein the synchronization signal falls within a second frequency band from 80 MHz to 102 MHz.

12. The slave communication device as claimed in claim 11, wherein the slave communication device is implemented with a tracker or a controller.

13. The slave communication device as claimed in claim 11, wherein the synchronization signal is a pulse signal.

14. The slave communication device as claimed in claim 11, wherein the synchronization signal is a CW (Continuous Wave) signal.

* * * * *